270-53
*I512 CR RE 32,410

United States Patent [19]

Mayer

[11] E Patent Number: Re. 32,410

[45] Reissued Date of Patent: May 5, 1987

[54] METHOD AND APPARATUS FOR TANDEM STITCHING OF BOOKS IN A BINDERY LINE

[75] Inventor: Theodore W. Mayer, Chicago, Ill.

[73] Assignee: R. R. Donnelley and Sons Company, Chicago, Ill.

[21] Appl. No.: 811,523

[22] Filed: Dec. 20, 1985

Related U.S. Patent Documents

Reissue of:

[64] Patent No.: 4,519,599
Issued: May 28, 1985
Appl. No.: 610,657
Filed: May 11, 1984

[51] Int. Cl.[4] ..... B42B 1/02

[52] U.S. Cl. ..... 270/53

[58] Field of Search ..... 270/53, 56, 58, 37; 227/78, 99–100, 56

[56] References Cited

U.S. PATENT DOCUMENTS

| | | | |
|---|---|---|---|
| 1,336,251 | 4/1920 | Maynard | 270/53 |
| 1,644,192 | 10/1927 | Kast | 270/53 |
| 1,738,586 | 12/1929 | Kleinschmit | 270/53 |
| 2,693,595 | 11/1954 | Belluche et al. | 270/53 X |
| 2,827,632 | 3/1958 | Faeber | 270/53 X |
| 3,032,336 | 5/1962 | Heigl et al. | 270/53 |
| 3,057,620 | 10/1962 | McCain | 270/53 |
| 3,362,304 | 1/1968 | Skolnick | 270/53 |
| 3,554,531 | 1/1971 | Heigl | 270/53 |
| 3,608,893 | 9/1971 | McCain et al. | 270/56 |
| 3,613,217 | 10/1971 | Perkins | 270/53 |
| 3,825,247 | 7/1974 | Fernandez-Rana et al. | 270/58 |
| 3,876,129 | 4/1975 | Bulka | 227/88 |
| 3,899,165 | 8/1975 | Abram et al. | 270/58 |
| 3,966,185 | 6/1976 | McCain et al. | 270/37 |
| 4,121,818 | 10/1978 | Riley et al. | 270/58 |

FOREIGN PATENT DOCUMENTS

| | | | |
|---|---|---|---|
| 595489 | 4/1960 | Canada | 270/53 |

*Primary Examiner*—E. H. Eickholt
*Attorney, Agent, or Firm*—Wood, Dalton, Phillips, Mason & Rowe

[57] ABSTRACT

The present invention accomplishes simultaneous stitching of tandem sets of 1-up gathered signatures. A shuttle mechanism grips adjacent, consecutive unbound books on a saddle-type gathering conveyor and, in a single stroke, presents both unbound books at a saddle stitcher station for simultaneous binding by two sets of individually controlled stitcher heads.

20 Claims, 9 Drawing Figures

FIG. 1
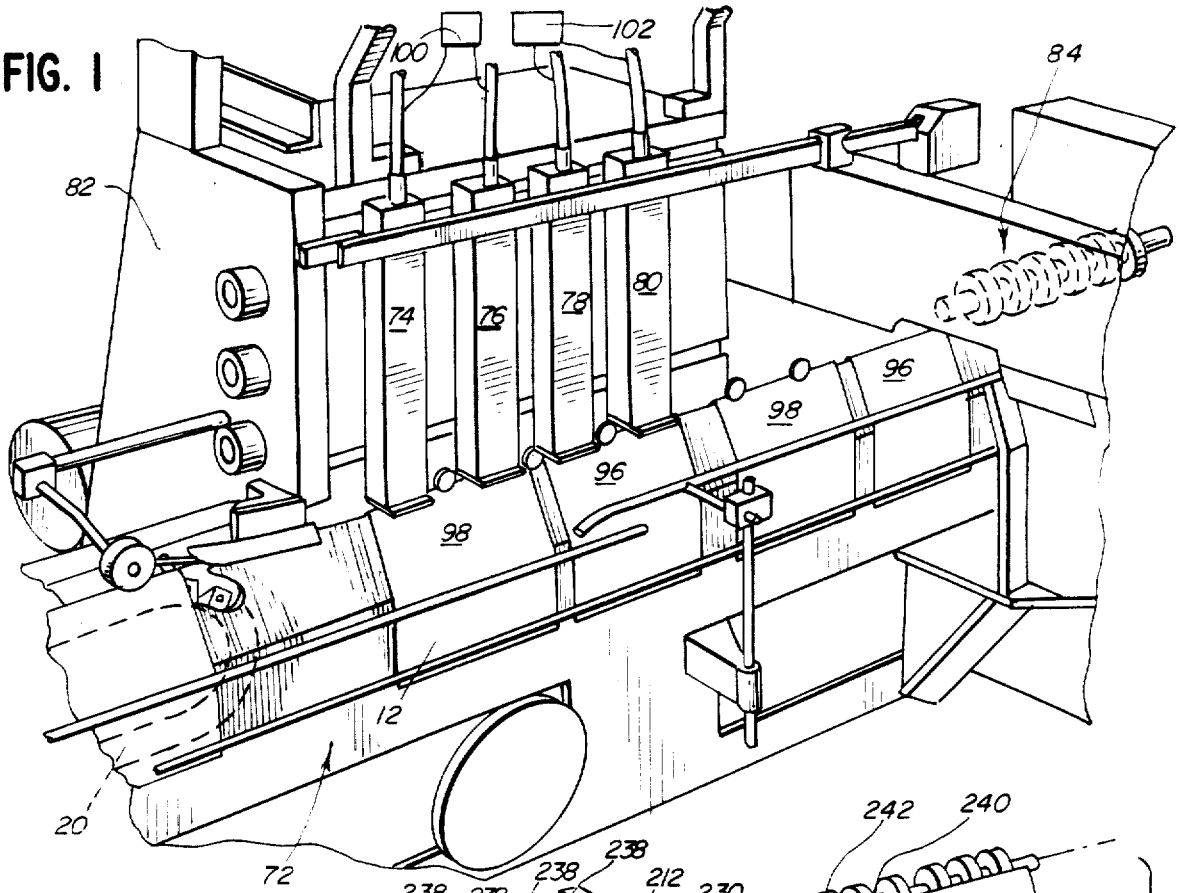
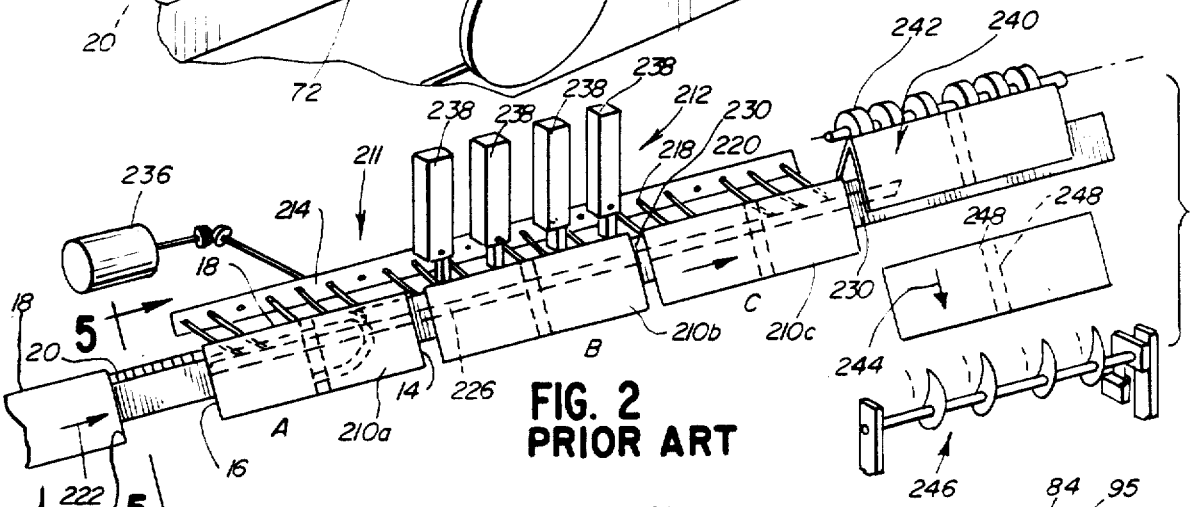
FIG. 2
PRIOR ART
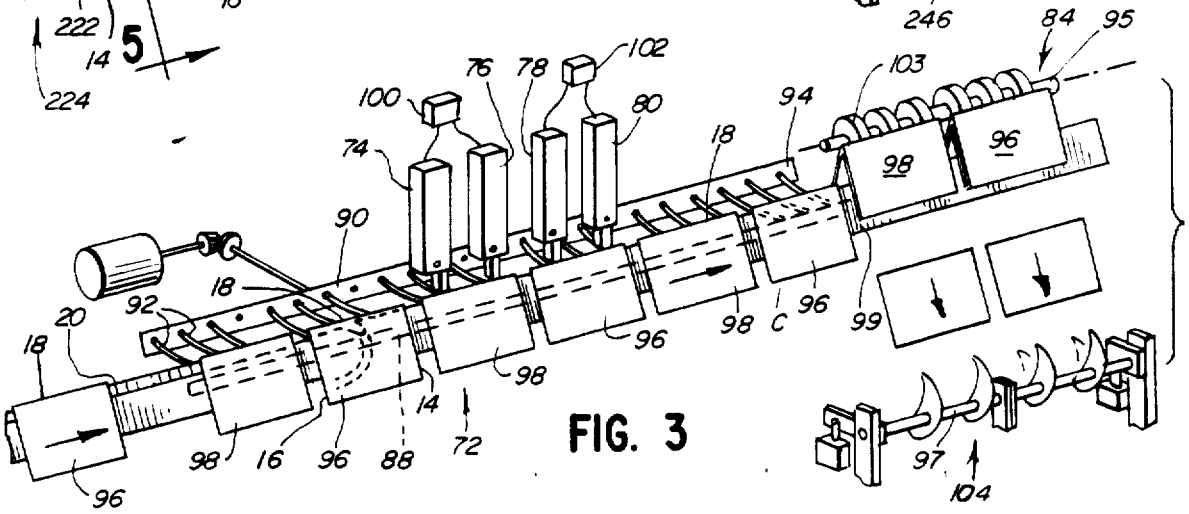
FIG. 3

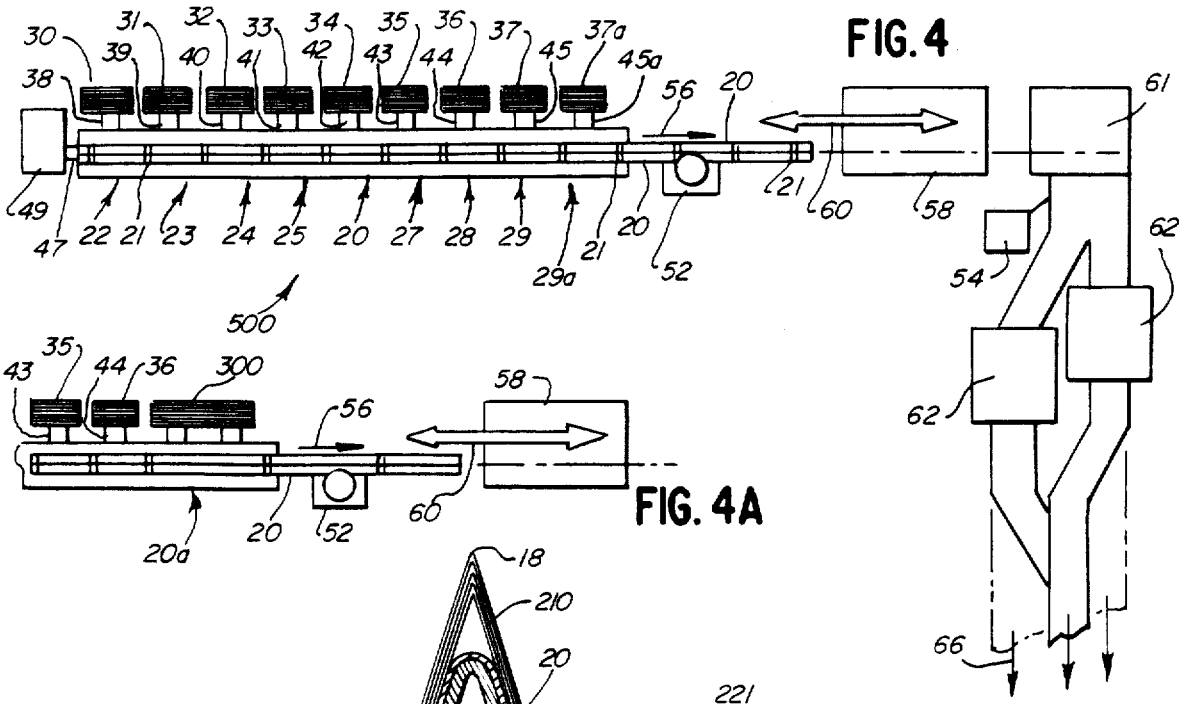
FIG. 4
FIG. 4A
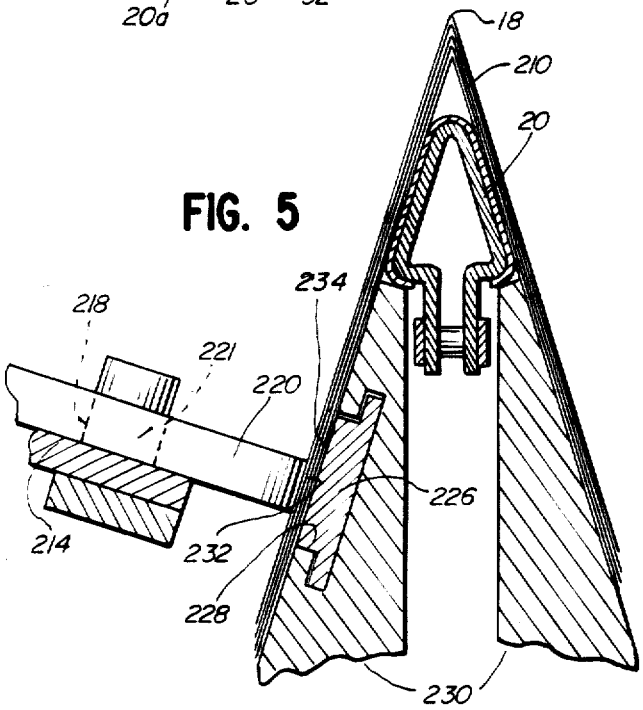
FIG. 5
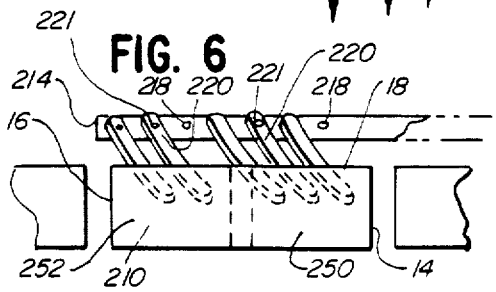
FIG. 6
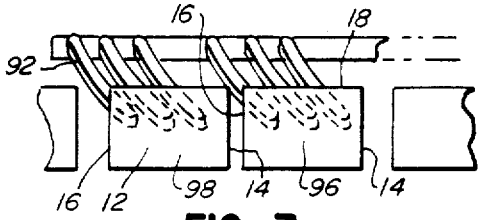
FIG. 7
FIG. 8
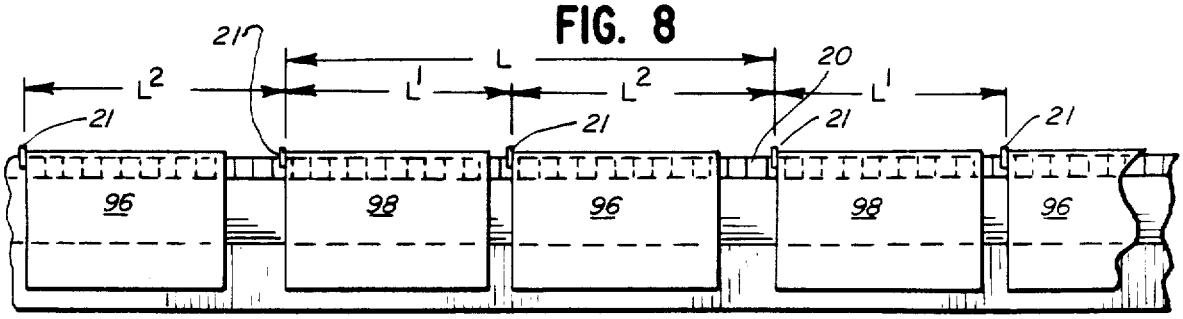

METHOD AND APPARATUS FOR TANDEM STITCHING OF BOOKS IN A BINDERY LINE

Matter enclosed in heavy brackets [ ] appears in the original patent but forms no part of this reissue specification; matter printed in italics indicates the additions made by reissue.

BACKGROUND ART

1. Field of the Invention

This invention relates to apparatus for gathering printed signatures to compose books and, more particularly, to a shuttle conveyor for tandem delivery of unbound book sets to a stitcher station and a stitcher for simultaneous binding of the book sets. The invention also relates to a method of delivering and binding two book sets in tandem.

2. Background Art

The designations 1-up and 2-up have been used in the bindery industry to identify distinct operating modes. In the 1-up mode, printed signatures used to compose individual books are consecutively gathered, bound and trimmed serially along a bindery line.

Because high volume binding of books is a time critical operation, an interest in speed prompted the advent of the 2-up machine. The basic 2-up operation is similar to 1-up operation with the primary distinction that each 2-up signature usually consists of identically printed halves married along a common edge. After stitching, the 2-up signatures are divided to derive separate books. Because each operation in the bindery line is performed on two books simultaneously, the potential output rate is increased over 1-up operation.

The interest in overall system flexibility has in the past competed with the goal of high speed production. The flexibility potential in modern 1-up bindery systems is demonstrated in U.S. Pat. Nos. 3,899,165 (Abram et al) and 4,121,818 (Riley et al), both assigned to the assignee of this invention.

According to the systems in Abram et al and Riley et al, it is possible to individually tailor each book according to the special interests of a subscriber without time consuming and expensive line changes. Individual lines can be set to produce customized books for a specific destination with individual books potentially provided with special pages, inserts and/or customized ink jetting on selected signatures internally of the books. This eliminates otherwise burdensome and complicated sorting by postal zone required to comply with postal regulations and take advantage of attractive postal discounts; or permits easy bundling of books for the most efficient and economical non-postal delivery.

In both 1-up and 2-up systems, a single stroke of a reciprocative shuttle conveyor takes one unbound book from a gathering conveyor and presents the same at a stitching station. Upon completion of the stitching, the bound book is moved away from the stitching apparatus for trimming, etc. The system bottleneck normally occurs at the stitching station. The output speed for the line is dictated by the speed of the single book stitcher which has inherent mechanical speed limitations. High speed stitchers also represent a substantial expense.

To date, the goals of high speed production and system flexibility have been to a certain extent mutually exclusive. The use of the 2-up mode, which potentially doubles production rate, eliminates much of the system flexibility. The married pages of the 2-up signatures are usually identical. The books can be customized only in pairs in the 2-up mode.

Another major factor which makes 2-up printing and binding less desirable than 1-up for certain types of work is the press room cost of printing in the 2-up mode. For example, in the case of a 32 page four color catalog, in the 1-up mode the entire catalog can be run with a single set of eight cylinders upon a single press. This means, for example, that a run of 1 million catalogs can be produced in a single press run.

In the 2-up mode, on the other hand, the two pages of one catalog which are printed at the same time must be duplicates of one another, so two press runs of 500,000 each are required to print the 32 pages. This substantially increases plate making and make-ready costs in the press room; although this is largely compensated for by the high output rate of the 2-up bindery line.

The present invention is specifically directed to overcoming the problems enumerated above in a novel and simple manner.

SUMMARY OF THE INVENTION

The present invention accomplishes simultaneous stitching of tandem sets of 1-up gathered signatures. A shuttle mechanism grips adjacent, consecutive unbound books on a saddle-type gathering conveyor and, in a single stroke, presents both unbound books at a saddle stitcher station for simultaneous binding.

It is the principal objective of the invention to potentially double the bindery production rate without sacrificing system flexibility. Signatures can be delivered to the conveyor as in the normal 1-up mode with all the advantages of 1-up operation and specifically those described in the Riley et al and Abram et al systems. The invention also permits the lower press room costs heretofore mentioned.

It is another aspect of the invention to independently control the stitching heads for each of the books in the tandem set presented at the stitcher station to disable a stitcher if a book is defective or missing.

The apparatus of the invention was originally developed as part of a program in which a commercially available 2-up bindery line is converted so that each 2-up gatherer feeding station feeds two 1-up signatures; and those two 1-up signatures are then fed as a tandem set for simultaneous stitching. Accordingly, the present disclosure relates to such a converted apparatus. However, the principal of feeding tandem sets of gathered signatures to a stitcher station for simultaneous binding is also applicable to other 1-up bindery lines.

Accordingly, the present invention also contemplates a method of converting the shuttle conveyor and stitching apparatus of a converted 2-up gathering machine to give the ability to tandem shuttle and stitch. By a simple conversion, the production rate potential for the converted 2-up machine can be greatly increased.

Other objects and advantages of the invention will become apparent upon reviewing the following detailed description, the claims and appended drawings.

BRIEF DESCRIPTION OF THE DRAWINGS

FIG. 1 is a fragmentary perspective view of a stitching station of a binding apparatus according to the present invention;

FIG. 2 is a fragmentary schematic perspective view of a conventional 2-up shuttle conveyor for delivering unbound 2-up signatures between a gathering conveyor and a stitching station and directing the bound signatures away from the stitching station;

FIG. 3 is a fragmentary schematic perspective view similar to that in FIG. 2 with the shuttle conveyor modified according to the present invention;

FIG. 4 is a schematic depiction of an exemplary 1-up bindery line to which the present invention is adaptable;

FIG. 4A is a schematic depiction of the last feeding stations in a 2-up line partially converted to 1-up operation;

FIG. 5 is a sectional view of the conveyor chain taken generally along the line 5—5 of FIG. 2 with the gripper arms engaging the signatures on the shuttle conveyor;

FIG. 6 is a fragmentary, schematic elevational view of the 2-up shuttle system of FIG. 2 illustrating the relationship between the shuttle gripper arms, the gathering chain and the signatures shortly before the gripper arms close to initiate a shuttle delivery stroke;

FIG. 7 is a view similar to that in FIG. 6 for the modified shuttle system of FIG. 3; and FIG. 8 is a fragmentary, schematic elevational view of 1-up signatures on a length of the gathering conveyor in the modified system of FIG. 3.

DETAILED DESCRIPTION OF THE INVENTION

Before the impact of the present invention can be appreciated, a description of the operation of a conventional bindery line is in order. An exemplary bindery line with saddle stitching, to which the present invention is adaptable, is depicted schematically in FIG. 4.

The binding operation involves the gathering of printed signatures in a prescribed manner. The gathered signatures are bound and ultimately depart as a finished book at the end of the line.

The signatures referred to throughout this description are identified as either 1-up or 2-up signatures. 2-up signatures 210 are shown in FIG. 2, and 1-up signatures 12 are shown in FIGS. 1 and 3. The 2-up signatures are essentially two identical 1-up signatures married along a common edge.

Each 1-up or 2-up signature comprises one or more sheets cut from a web and folded to define a head end 14, a tail end 16 and a closed side 18 which straddles an endless gathering conveyor chain 20, as shown in FIGS. 5 and 8.

Referring to FIG. 4, a line of 1-up signature feeding stations 22–29a is provided. The stations 22–29a comprise respective signature supply hoppers 30–37a for stacked signatures, and respective known feeder mechanism 38–45a for directing signatures from the supply hoppers 30–37a into straddling relation with the gathering conveyor chain 20 moving in front of the hoppers. The feeder mechanism at the station 29a delivers a cover onto the gathered signature to complete an unbound book. The feeder mechanisms 38–45a are driven together through a common shaft 47 by a drive means 49 which also drives the conveyor chain 20.

The unbound books are formed by gathering the signatures on the chain serially along the length of the signature feeding section designated generally at 50. The chain is divided into carrying segments designated alternately $L^1$ and $L^2$ (FIG. 8) by pusher lugs 21 which bear against the tail ends of the signatures in a forming, unbound book as the chain 20 advances. The signatures are delivered to the carrying segments at timed intervals determined by the speed of the drive means 49 in FIG. 4.

A caliper station 52, downstream of the feeding section 50, detects the thickness of each passing unbound book. The caliper determines whether or not the exact number of signatures called for has actually been gathered. Multiple inclusion of one or more signatures or the absence of a signature in one of the unbound books is detected, causing a signal to be sent to a reject/divert station at 54, which diverts the defective book out of the stream.

From the caliper 52, the unbound books, which still reside on the gathering conveyor chain moving in the direction of arrow 56, are advanced to a stitcher station 58 by means of a shuttle conveyor 60 depicted as a double headed arrow in FIG. 4. The shuttle conveyor 60 operates reciprocatively and delivers each book stepwise to and through the stitcher station 58.

A full stroke of the shuttle 60 presents an unbound book from the gathering conveyor to the stitching station 58 for binding. With a bound book at the stitching station and an unbound book at the end of the gathering conveyor, a following stroke simultaneously delivers the unbound book from the gathering conveyor to the stitching station and the bound book from the stitching station to a delivery station 61, which diverts the bound book toward at least one trimmer station 62. Two trimmers are shown in FIG. 4. The output from the trimmers is delivered in the direction of arrows 66 for stacking and bundling for shipping, either in one line, as shown, or in two lines.

Reference is now made to FIGS. 2 and 6, which show a prior art 2-up shuttle conveyor at 211 and stitching station at 212. The shuttle conveyor 211 comprises a gripper bar 214 and a cooperating undergripper rail 226, both mounted for reciprocative movement in substantially parallel alignment with the length of the endless gathering conveyor chain 20. The gripper bar 214 has a plurality of longitudinally spaced bores 218 for accepting pins 221 used to pivotally mount gripper arms 220. The gripper arms 220 are selectively positionable along the gripper bar as dictated by the length of the signature between the head and tail ends to effect the stepwise delivery of books to and through the stitcher.

In the prior art system of FIGS. 2 and 6, the gathered 2-up signatures 210 forming an unbound book are advanced in the direction of arrow 222 by the conveyor chain 20 and toward the shuttle conveyor 211. The book 210a at a transition position A in FIG. 2 is at the area of exchange between the gathering conveyor chain 20 and the shuttle conveyor 211. The gripper bar 214 in FIG. 2 is shown in a pickup position. As shown in FIG. 2, the gripper bar 214 is moving alongside the conveyor chain 20 toward the stitcher heads; and when the endmost 2-up unbound book 210a on the chain reaches a point where it is the same distance from the just-bound book 210b at the stitching station as the latter book is from the next more advanced book 210c, the grippers 220 all close simultaneously.

As seen in FIG. 5, which shows the parts of the 2-up apparatus of FIG. 2 but is equally illustrative of a standard 1-up machine or of the 2-up to 1-up conversion of FIG. 3, in the pickup position the grippers 220 are caused to bear against the undergripper rail 226 which slides in a slot 228 in an inverted V-shaped signature support saddle 230 in the shuttle section 211. As shown in FIG. 5, the gathered signatures 210 are captured between a flat face 232 on each gripper arm 220 and a mating face 234 on the undergripper rail 226. As the gripper bar is moved in the direction of arrow 222 in FIG. 2 by a drive means 236, the cooperating gripper arms 220 and undergripper rail cause the gathered signatures to be advanced along the saddle.

As shown in FIG. 6, each 2-up unbound book consists of a leading book 250 and a trailing book 252. In the particular arrangement shown in FIG. 6, the leading book 250 is engaged by three gripper arms 220 while the trailing book 252 is engaged by two gripper arms 220. This is sufficient to move the entire 2-up unbound book during the shuttle stroke. Other 2-up shuttle conveyors may have different numbers of gripper arms engaging the 2-up inbound book.

A full gripper stroke moves the unbound book from transition position A to a stitching position B beneath the four stitcher heads 238. The stitcher heads 238 are commonly controlled and operated to clinch four staples to bind the book. During the stitching operation, the gripper arms 220 are pivoted to a release position and the reciprocating gripper bar 214 makes a return stroke. Upon completion of the stitching operation, the gripper arms again close and the gripper advances to move the next unbound book from position A to position B and to move the newly stitched book from position B to a rest position C where inserts may be placed in the bound books. The rest position C might be altogether eliminated, in which event each gripper bar stroke places the newly stitched book at a delivery station 240.

At the delivery station 240, pick-up rollers 242 divert the bound 2-up books transversely from their original line as shown by an arrow 244, through a reject/divert station 246 where defective books detected by a caliper (like 52 in FIG. 4) are expelled from the system, and then to a trimmer where the 2-up books are separated and trimmed generally along lines 248 and along the opposite ends and open sides of the two books. A trimmer for 2-up books is necessarily very different from a trimmer for 1-up books. In 2-up trimming the face cut and two end cuts are made as if the book were 1-up. The books are then cut apart which finishes one of the books. Yet another cut is needed to finish the second book.

The details of a machine incorporating the present invention are shown in FIGS. 1, 3, 7 and 8. In accordance with the invention, books consisting of gathered 1-up signatures are taken in tandem sets by a shuttle to and away from the stitching station.

The stitching station and shuttle feeder of the invention are depicted in FIG. 1. As in the prior art system previously described, an endless gathering conveyor chain 20 is used to deliver unbound books 12 to a shuttle conveyor station 72. The shuttle conveyor moves the unbound books from the gathering conveyor beneath stitcher heads 74, 76, 78, 80 carried on a vertical stitcher column 82. Upon completion of the stitching operation, the bound books are moved to an intermediate station C or directly to a delivery station at 84.

The overall operation of the modified system of FIG. 3 is similar to that of the prior art system discussed relative to FIG. 2. However, rather than advancing gathered 2-up signatures, the invention contemplates simultaneous shuttling of a tandem pair of unbound books and simultaneous stitching of the tandem pair. This provides an output about as fast as a 2-up machine; but with the flexibility of 1-up operation.

To convert one commercially available 2-up machine for tandem shuttle and stitching operations, the gripper bar 214 and the undergripper rail 226 and slot 228 must be lengthened and the stitcher heads 74, 76, 78 and 80 must be divided into two pairs, each pair having an independent control means as will be described in detail.

The present invention extends the gripper bar 90 in FIG. 3 in the direction of the conveyor to accommodate an additional gripper arm 92. Where only a single gripper arm engages a trailing book more than one additional gripper arm may be provided. This extension can be accomplished by substituting a longer gripper bar or by adding an extension piece 94 to either end of the gripper bar 90. Extension of the undergripper rail may be carried out in like manner.

FIG. 7 illustrates the preferred arrangement of the gripper arms in relationship to a leading unbound book 96 and a trailing unbound book 98, which together comprise a tandem set that is shuttled and simultaneously stitched according to the present invention. The provision of at least three gripper arms on each unbound book in each set is preferred to assure positive advance. If shifting of the gripper bar is effected to provide the additional gripper, the remainder of the gripper arms along the length of the gripper bar can be repositioned to accommodate this shift. Further, the undergripper rail 88 is extended in the direction of the gathering chain, and the guide slot is extended, to assure an effective hold on the signatures.

FIG. 4A illustrates a mode of operation which may be used without modifying the reject and the trimmer of a 2-up machine, as is required by the mode of operation heretofore described. In the arrangement of FIG. 4A, a last signature feeder 300 of a 2-up machine is not converted, and is used to feed 2-up covers onto tandem pairs of gathered sets of 1-up signatures. For best results, a short lug must be used at the trailing end of the first book, so as not to distort the central area of the cover. This permits the books in a tandem pair to be handled as a unit at the reject and trimmer stations, thereby simplifying the conversion of a 2-up machine to 1-up and making it much less expensive.

The last described mode of operation requires that the same cover be used on both books of a tandem set; but does not otherwise interfere with customizing the two books. In full 1-up operation different covers may be fed alternatively at the feeding stations 29 and 29a if desired.

As previously stated, another aspect of the invention is the provision of separate controls for stitcher head pairs 74, 76 and 78, 80. By providing individual control means 100, 102, either of the stitcher head pairs 74, 76 or 78, 80 may be disabled in the event of a defective or missing book.

To accommodate the separate 1-up, bound signatures of the system shown in FIG. 3, the shaft 95 with pick-up rollers 103 at the delivery station is split as an accommodation for potentially different book thicknesses. Further, the shaft 97 at the reject/divert station 104 is split so that either of the two books from the tandem set can be rejected without having to reject the other.

FIG. 8 illustrates a further step that is required to convert some 2-up machines to 1-up operation. Certain 2-up machines use a 26 inch spacing L between lugs 21 on the gathering chain 20. The entire span across the four stitcher heads 238 is such that in order for them to handle two unbound 11½ inch books 96 and 98 of a tandem set, the total length from the leading end 14 of book 96 to the trailing end 16 of book 98 cannot exceed 24 inches. This requires that carrying segments L1 be 12 inches while carrying segments L2 are 14 inches; providing a one inch space between the two books of a tandem set and a 2 inch space between the trailing end 16 of a book 98 and the leading end 14 of the next succeeding book 96.

The very small space between the leading end of a second book 98 of a tandem pair and the pusher lug 21 for the first book 96 of the pair requires very fine adjustment of the shuttle conveyor pick-up point relative to the horn at the receiving end of the saddle 90 for the stitcher. This is because the shuttle moves the tandem unbound books forward faster than the gatherer chain 20 is moving, and to prevent interference between the leading end 16 of a book 98 and the lug 21 that is only one inch ahead of it, that lug must swing around the end of the chain carrying sprocket and be below the horn before the leading end 16 of the book 98 can hit it. The needed adjustments can be made using controls with which the machine is equipped.

The apparatus of the present invention has the same capacity for handling books of different thicknesses and different trim sizes as do various commercially available gathering and saddle stitching machines.

The foregoing detailed description is given for clearness of understanding only and no unnecessary limitations are to be understood therefrom.

I claim:

1. In apparatus for gathering and saddle stitching printed signatures each of which has a closed side, a head end and a tail end, to form books consisting of said signatures, said apparatus including a line of signature feeding stations, each of said stations having a signature supply hopper and means for feeding signatures seriatim from said supply hopper, and there being a cover means feeding station at a downstream end of said line, an endless saddle-type gathering conveyor moving in front of said feeding stations, said conveyor having signature carrying segments each of which gathers signatures fed successively from selected ones of said feeding stations to straddle the carrying segments in overlying relationship with their closed sides up and thus form unbound books each of which includes cover means and each said carrying segment having a pusher lug to bear against the tail ends of signatures in a forming unbound book, and a saddle stitcher that has stitcher head means and shuttle conveyor means to receive the unbound books and deliver them stepwise to and then through the stitcher head means, the improvement comprising, in combination:

the shuttle conveyor means includes a plurality of sets of gripper means to grip two successive unbound books for handling as a tandem set as they leave the gathering conveyor and move said unbound books in said tandem set to the stitcher head means simultaneously;

the stitcher head means has two sets of stitcher heads to simultaneously bind both books of a tandem set;

and the shuttle conveyor means is adapted to simultaneously remove a tandem set of bound books from the stitcher head means and deliver the next succeeding tandem set of unbound books to the stitcher head means.

2. The improvement of claim 1 wherein said signatures forming the books are 1-up signatures and a separate cover means overlies each of the books in each tandem set.

3. The improvement of claim 1 wherein said signatures forming the books are 1-up signatures, and a single 2-up cover means overlies both books of a tandem set.

4. Improved apparatus for gathering and saddle stitching printed signatures each of which has a closed side, a head end and a tail end, said apparatus comprising:

a line of signature hoppers each capable of storing a supply of signatures;

a saddle-type conveyor having a gathering chain with signature carrying segments for receiving signatures from said hoppers in straddling spaced end-to-end relationship;

means for advancing the conveyor chain;

means for delivering a first layer of signatures from said hoppers into straddling relationship with said conveyor in successive signature carrying segments and laying successive layers of signatures from said hoppers on said signatures in said first layer in a prescribed fashion;

stitching means for simultaneously stitching at least two endwise adjacent spaced signatures in the first layer to the signatures laid thereupon;

means for simultaneously shuttling the two adjacent signatures in the first layer and the signatures laid thereon from said conveyor to said stitching means;

and means for moving the two adjacent signatures and signatures laid thereon away from said stitching means subsequent to a stitching operation.

5. The improved machine according to claim 4 wherein said stitching means comprises at least first and second stitching heads and means are provided to independently operate said first and second stitching heads.

6. The improved machine according to claim 4 wherein said shuttling means comprises a gripper bar, an undergripper, a plurality of gripper arm means on the gripper bar for capturing the signatures including the entire first layer of signatures against the undergripper, and means for shifting the gripper bar and undergripper simultaneously through a stroke to effect an advance of the signatures.

7. The improved machine according to claim 6 wherein the gripper arm means are so arranged on the gripper bar as to firmly and positively engage each of the two adjacent signatures in the first layer and the signatures laid thereon to assure a positive advance of each of the two adjacent signatures and signatures laid thereon.

8. Improved apparatus for saddle stitching unbound books consisting of printed signatures each of which has a closed side, a head end and a tail end, said unbound books being carried in end-to-end spaced relationship straddling successive segments of a conveyor chain that is moving toward a saddle stitching means, said apparatus comprising:

stitching means for simultaneously binding two consecutive books which form a tandem set;

means for simultaneously shuttling two unbound books as a tandem set from said conveyor to said stitching means;

and means for moving the books of a tandem set away from said stitching means subsequent to a stitching operation.

9. The improved apparatus of claim 9 in which the saddle stitching means includes two sets of stitcher heads each of which stitches one of two tandem books, and means for independently controlling said two sets of stitcher heads selectively for simultaneous or separate operation.

10. The improved apparatus of claim 9 in which the means for simultaneously shuttling a tandem set of unbound books from the conveyor to the stitching means includes a reciprocating undergripper rail and a cooperating reciprocating gripper bar both of which have end portions which, at one end of their reciprocatory path, are alongside the two consecutive segments of the conveyor chain that are nearest the stitching means, two longitudinally spaced gripper arm means on said gripper bar, each of said gripper arm means being adapted to firmly and positively clamp one of the two unbound books of a tandem set against the undergripper rail, and means for moving all said gripper arm means simultaneously between a released position and a clamping position for shuttling successive tandem sets from the conveyor chain to the stitching means.

11. The improved apparatus of claim 10 in which the undergripper rail and the gripper bar are of a length sufficient to accommodate at least two additional longitudinally spaced gripper arm means which are moved by said last named means to grip a tandem set of stitched books and move them away from the stitching means while said first named gripper arm means move a tandem set of unbound books to the stitching means.

12. The improved apparatus of claim 8 in which the means for simultaneously shuttling a tandem set of unbound books from the conveyor to the stitching means includes a reciprocating undergripper rail and a cooperating reciprocating gripper bar both of which have end portions which, at one end of their reciprocatory path, are alongside the two consecutive segments of the conveyor chain that are nearest the stitching means, two longitudinally spaced gripper arm means on said gripper bar, each of said gripper arm means being adapted to firmly and positively clamp one of the two unbound books of a tandem set against the undergripper rail, and means for moving all said gripper arm means simultaneously between a released position and a clamping position for shuttling successive tandem sets from the conveyor chain to the stitching means.

13. The improved apparatus of claim 12 in which the undergripper rail and the gripper bar are of a length sufficient to accommodate at least two additional longitudinally spaced gripper arm means which are moved by said last named means to grip a tandem set of stitched books and move them away from the stitching means while said first named gripper arm means move a tandem set of unbound books to the stitching means.

14. A method of tandem stitching signatures, each of which has a closed side, a head end and a tail end, selectively gathered to define unbound books consisting of the signatures along an advancing saddle-type conveyor chain, said method comprising the steps of:

placing two first layer signatures against successive signature carrying segments on said conveyor;

laying successive layers of signatures on said two first layer signatures in a prescribed fashion;

simultaneously shuttling said two first layer signatures and signatures laid thereon from said conveyor to a stitching apparatus;

simultaneously stitching said two first layer signatures to the signatures laid thereon with said stitching apparatus; and moving the two first layer signatures and signatures laid thereon away from said stitching apparatus.

*15. A method of stitching signatures, each of which has a closed side, a head end and a tail end, selectively gathered to define unbound books consisting of the signatures along an advancing saddle-type conveyor chain, said method comprising the steps of:*

*placing first and second first layer signatures against successive signature carrying segments on said conveyor;*

*laying successive layers of signatures on said first and second first layer signatures in a prescribed fashion;*

*simultaneously bringing the first and second first layer signatures with the signatures laid thereon and a stitching apparatus into operative relationship with one another;*

*simultaneously stitching said first and second first layer signatures to the signatures laid thereon with said stitching apparatus;*

*and taking the first and second first layer signatures with the signatures laid thereon and said stitching apparatus out of operative relationship with one another.*

*16. The method of claim 15 including the steps of placing third and fourth first layer signatures against successive signature carrying segments on said conveyor with the third first layer signature on a carrying segment trailing the second first layer signature on the conveyor, laying successive layers of signatures on said third and fourth first layer signatures in a prescribed fashion, bringing said third and fourth first layer signatures with said successive layers of signatures thereon and said stitching apparatus into operative relationship with one another simultaneously as the first and second first layer signatures with the signatures laid thereon and said stitching apparatus are taken out of operative relationship with one another.*

*17. A method of stitching signatures, each of which has a closed side, a head end and a tail end, selectively gathered to define unbound books consisting of the signatures along an advancing saddle-type conveyor chain, said method comprising the steps of:*

*placing two first layer signatures against successive signature carrying segments on said conveyor;*

*laying successive layers of signatures on said two first layer signatures in a prescribed fashion;*

*simultaneously moving said first layer signatures and signatures laid thereon to a stitching apparatus;*

*simultaneously stitching said two first layer signatures and signatures laid thereon;*

*and simultaneously moving all said signatures away from said stitching apparatus.*

*18. In apparatus for gathering and saddle stitching printed signatures each of which has a closed side, a head end and a tail end, to form books consisting of said signatures, said apparatus including a line of signature feeding stations, each of said stations having a signature supply hopper and means for feeding signatures seriatim from said supply hopper, and there being a cover means feeding station at a downstream end of said line, an endless saddle-type gathering conveyor moving in front of said feeding stations, said conveyor having signature carrying segments each of which gathers signatures fed successively from selected ones of said feeding stations to straddle the carrying segments in overlying relationship with their closed sides up and thus form unbound books each of which includes cover means and each said carrying segment having a pusher lug to bear against the tail ends of signatures in a forming unbound book, and a saddle stitcher that has stitcher head means, the improvement comprising, in combination:*

*the stitcher head means has first and second sets of stitcher heads to simultaneously stitch two successive unbound books;*

*means for bringing first and second successive unbound books and said first and second sets of stitcher heads simultaneously into operative relationship with one another;*

*means for simultaneously binding said first and second unbound books to provide first and second books;*

*and means for taking said first and second books and said first and second sets of stitcher heads out of operative relationship with one another.*

*19. The improvement of claim 18 wherein the means for taking the first and second books and the first and second stitcher heads out of operative relationship with one another simultaneously brings third and fourth unbound books and said first and second stitcher heads into operative relationship with one another.*

*20. Improved apparatus for saddle stitching unbound books consisting of printed signatures each of which has a closed side, a head end and a tail end, said unbound books being carried in end-to-end spaced relationship straddling successive segments of a conveyor chain that is moving toward a saddle stitching means, said apparatus comprising:*

*stitching means for simultaneously binding two consecutive books;*

*means for simultaneously bringing two consecutive unbound books and the stitching means into operative relationship with one another;*

*and means for taking the two books and said stitching means out of operative relationship with one another subsequent to a stitching operation.*

* * * * *